United States Patent
Bleuse et al.

(10) Patent No.: US 6,324,579 B1
(45) Date of Patent: *Nov. 27, 2001

(54) PERSONALIZING ACCESS TO THE INTERNET VIA AN ACCESS NETWORK AND AN INTERNET SERVICE PROVIDER USING AN INTERNET SUBSCRIBER PROFILE

(75) Inventors: Patrice Bleuse, La Ville du Bois; Martine Lapierre, Meudon, both of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,197

(22) Filed: Apr. 20, 1999

(30) Foreign Application Priority Data

Apr. 30, 1998 (FR) .................................................. 98 05 540

(51) Int. Cl.[7] .................................................... G06F 15/16
(52) U.S. Cl. ........................................... 709/227; 709/217
(58) Field of Search ..................................... 709/227–229, 709/220, 249; 370/385, 389, 351; 379/229

(56) References Cited

U.S. PATENT DOCUMENTS

| | | | | |
|---|---|---|---|---|
| 4,757,267 | * | 7/1988 | Riskin ................................. | 379/113 |
| 5,423,003 | * | 6/1995 | Berteau .............................. | 709/227 |
| 5,530,852 | * | 6/1996 | Meske, Jr. et al. ................ | 709/206 |
| 5,602,991 | * | 2/1997 | Berteau .............................. | 709/227 |
| 5,610,910 | | 3/1997 | Focsaneanu et al. .............. | 370/351 |
| 5,828,666 | | 10/1998 | Focsaneanu et al. .............. | 370/389 |
| 5,845,087 | * | 12/1998 | Trehus ................................ | 709/249 |
| 5,862,339 | * | 1/1999 | Bonnaure et al. ................. | 709/227 |
| 5,867,498 | * | 2/1999 | Gillman et al. .................... | 370/385 |
| 5,881,234 | * | 3/1999 | Schwob . | |
| 5,889,958 | * | 3/1999 | Willens .............................. | 709/229 |
| 5,898,839 | * | 4/1999 | Berteau .............................. | 709/227 |
| 5,915,008 | * | 6/1999 | Dulman .............................. | 379/201 |
| 5,958,016 | * | 9/1999 | Chang et al. . | |
| 6,195,692 | * | 2/2001 | Hsu .................................... | 709/219 |
| 6,199,077 | * | 3/2001 | Inala et al. ......................... | 707/501 |

* cited by examiner

*Primary Examiner*—David Wiley
(74) *Attorney, Agent, or Firm*—Sughrue, Mion, Zinn, Macpeak & Seas, PLLC

(57) ABSTRACT

In a method of personalizing access to the Internet via an access network and an Internet service provider, the access network allocates an Internet caller profile when setting up a telephone call to access the Internet. The access network transmits the Internet caller profile to the Internet service provider and the Internet service provider personalizes access to the Internet in accordance with the Internet caller profile. Functions of an access network such as the intelligent network are used to personalize Internet access in a fashion that is transparent for the user and independent of the Internet service provider.

13 Claims, 1 Drawing Sheet

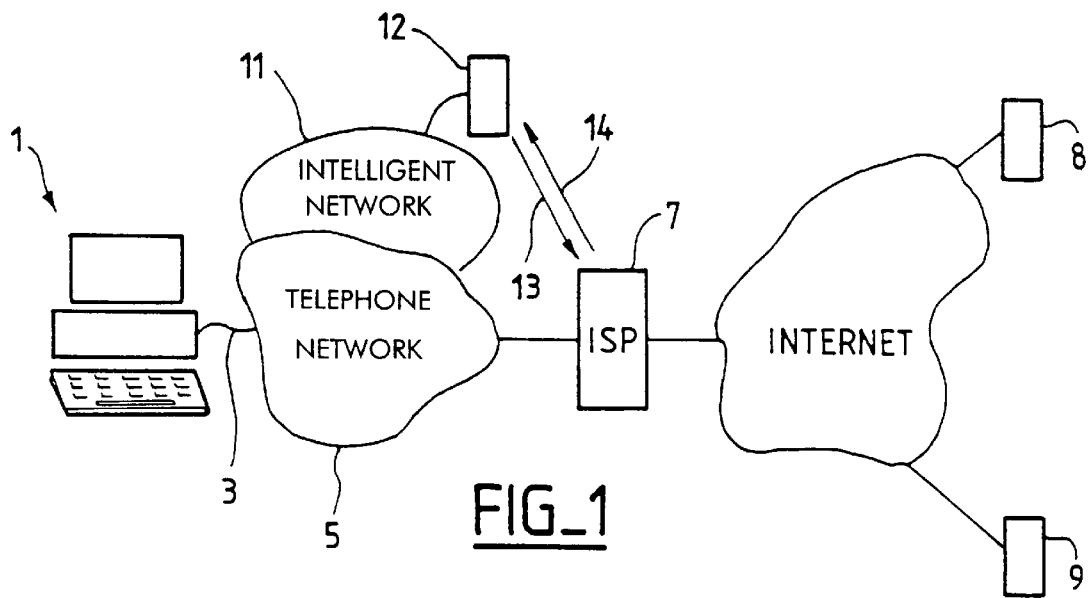
FIG_1
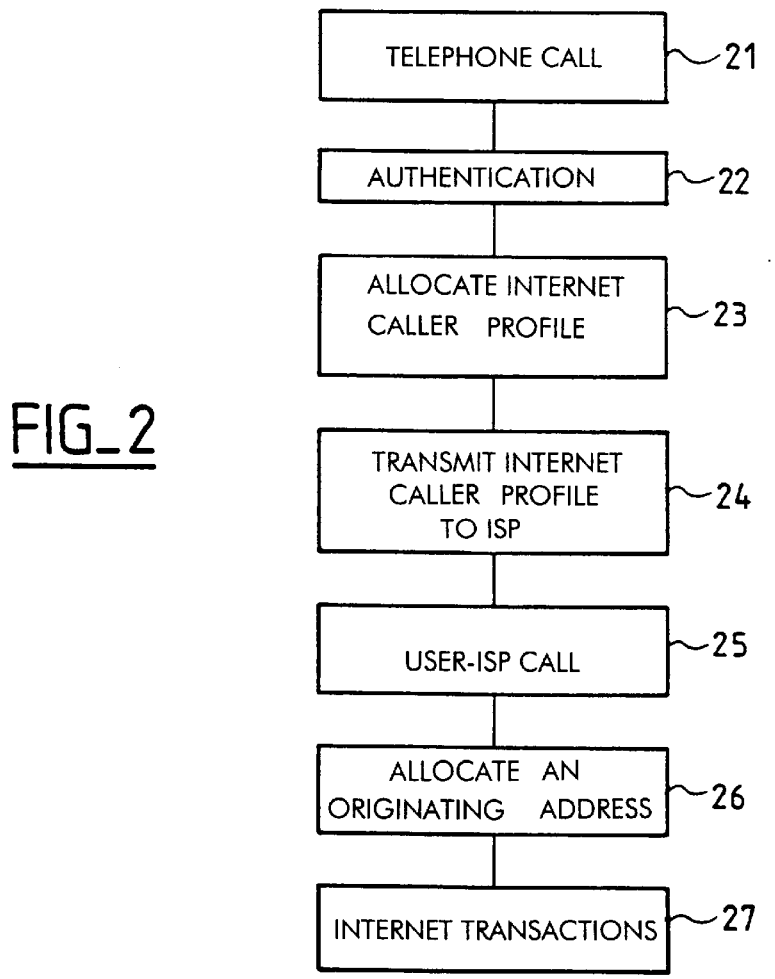
FIG_2

PERSONALIZING ACCESS TO THE INTERNET VIA AN ACCESS NETWORK AND AN INTERNET SERVICE PROVIDER USING AN INTERNET SUBSCRIBER PROFILE

BACKGROUND OF THE INVENTION

1. Field of the Invention

The present invention concerns a method of personalizing Internet access; it also concerns an intelligent telephone network and a service for personalizing Internet access.

2. Description of the Prior Art

The invention concerns access to networks and more particularly access to the Internet. In the remainder of the description the Internet will be used by way of example on the understanding that the invention could be applied to other networks.

A user generally accesses the Internet from a user terminal using the telephone network to set up a call to an Internet Service Provider (ISP). The telephone network can be the standard public switched telephone network, a public mobile network, a digital network such as the integrated services digital network. The ISP dynamically allocates the user an Internet address enabling the user to send and receive calls to and from content providers using the Internet protocol.

Intelligent network services are added value services provided by telephone operators, over and above line set up and billing. These services include call forwarding, pre-payment, toll free calls, special rates for certain calls, calling party authentication and the like, for example.

The rapid expansion of the Internet has given rise to new problems; in terms of content, the information available on the network can be shocking (in particular information of an erotic nature) or its distribution can be illegal in certain contexts (certain political information). Depending on the envisaged use of the network, various forms of filtering are desirable, such as filtering by parents of access to the network by children, filtering by governments of information circulated in their territory via the network and filtering by companies of access to the network by their employees.

Various solutions have already been proposed for filtering information obtained on the network, including software products designed to be installed on the terminal of a user for filtering access to certain Internet sites. These products are limited and filtering on the basis of the site name is difficult to implement because it calls for continuous updating. Such updating is difficult in practice given the large number of sites created each day and the ease of transferring from one site to another Internet address. Such filter devices can be deactivated relatively easily, for example using information available on the network.

In addition to this familiar filtering problem there arises a new problem of matching the Internet to characteristics specific to a given calling party. There is also the new problem of maintaining the same type of service independently of the service provider.

The invention proposes a solution to the new problem of adapting Internet consultation to characteristics specific to a user. It further enables a bespoke service to be offered to a user, whichever ISP is chosen.

SUMMARY OF THE INVENTION

To be more precise, the invention proposes a method of personalizing access to the Internet via an access network and an Internet service provider, the method comprising the following steps:

the access network allocates an Internet caller profile when setting up a telephone call to access the Internet, the access network transmits the Internet caller profile to the Internet service provider, and the Internet service provider personalizes access to the Internet in accordance with the Internet caller profile.

In one embodiment of the invention the access network is an intelligent network. The access network can include an intelligent function for managing Internet caller profiles.

The Internet caller profile advantageously includes information relating to Internet transactions such as access filtering information.

The Internet caller profile can also include information relating to the telephone call, such as billing, payment or call authorization information.

In one embodiment of the invention the Internet caller profile includes information common to all Internet service providers and information specific to each Internet service provider. It can also include information specific to one user.

The method advantageously includes a step in which the Internet service provider updates the Internet caller profile or a step in which the user updates the Internet caller profile.

The method preferably includes a step in which the access network creates the Internet caller profile.

The Internet caller profile of a user is advantageously retained from one Internet access to another or in the event of a change of Internet service provider.

The invention also proposes an intelligent access network including means for allocating an Internet caller profile during the setting up of a telephone call for access to the Internet and means for transmitting the Internet caller profile to an Internet service provider.

The network can include means for receiving information for updating an Internet caller profile from an access provider.

The invention also proposes a method of personalizing Internet access including:

allocating an Internet caller profile to a user, and transmitting the Internet caller profile to an Internet service provider when setting up a call to access the Internet.

The Internet caller profile advantageously includes information relating to Internet transactions such as access filtering information.

In another embodiment of the invention the Internet caller profile includes information relating to the telephone call such as billing, payment or call authorization information.

The Internet caller profile can also include information common to all Internet service providers and information specific to each Internet service provider.

Other features and advantages of the invention will become apparent on reading the following description of embodiments of the invention relating to the Internet, provided by way of example only and referring to the accompanying drawings.

BRIEF DESCRIPTION OF THE DRAWINGS

FIG. 1 is a diagrammatic representation of an Internet link.

FIG. 2 is a flowchart showing the steps of a method of Internet access in accordance with the invention.

DETAILED DESCRIPTION OF THE PREFERRED EMBODIMENT

FIG. 1 shows a user terminal 1 connected by a link 3 to an access network 5; in the example shown in the figure and throughout the remainder of the description a telephone network is referred to, such as a public switched telephone network, a public mobile telephone network, etc. The user terminal can be connected to the network directly or via a PABX. The figure shows an Internet service provider 7, the Internet and two content providers 8 and 9. The user terminal 1 and the service provider (to the left of the ISP in FIG. 1) communicate on a channel of the telephone network, the nature of which differs according to the network. The service provider and the content providers communicate in accordance with the Internet protocol.

The invention proposes to use the capabilities of the intelligent network 11 to access the Internet. To this end it proposes to use the telephone network to manage an Internet caller profile. The profile is allocated by the telephone network when a telephone call is set up to access the Internet. It is transmitted to the chosen service provider who can then parameterize or personalize communication with the Internet.

The Internet caller profile can be managed and transmitted simply by using the functions of the intelligent network and, if necessary, calling party authentication and identification functions.

Internet access in accordance with one embodiment of the invention will now be described with reference to FIG. 2. The figure shows the steps of such access. In a first step 21 the user enters into communication with the service provider. In the example shown, the user sets up a telephone call by dialing the telephone number of the service provider. The user could dial a telephone number common to more than one service provider.

The telephone network authenticates the user, if necessary, in step 22. An intelligent network service known per se can be used for such authentication, based on a password, magnetic stripe card, microchip card, etc.

After authentication, if necessary, the telephone network allocates the user an Internet caller profile in step 23. The Internet caller profile comprises all the parameters used to customize Internet access. These parameters can be transmitted in full or in the form of a short code or using any intermediate solution. The parameters can be Internet parameters, for example a list of sites forbidden or authorized, environment variables, virtual private group, billing parameters, the users subscription number with the service provider or other, and parameters relating to the telephone call, for example type of transmission to be used, protection by encryption, payment, billing, etc. The original definition of an Internet caller profile can be proposed by the intelligent network on the first connection or can correspond to a subscription. The profile is then advantageously retained, from one Internet access to another, possibly even in the event of a change of service provider.

The telephone network transmits the Internet caller profile to the service provider in step 24. The service provider can be chosen by the telephone number dialed or determined from the Internet caller profile. The telephone call between the user and the service provider can then be set up (step 25) and the supplier can allocate the user an originating IP address (step 26). The user can then send and receive messages using the Internet protocol (step 27). During this step the service provider can continue to consult and use the parameters of the Internet caller profile to personalize the service provided, as explained below.

The Internet caller profile can advantageously be updated by the service provider, for example to prevent subsequent access attempts by a user, as explained below. There can also be provision for the Internet caller profile to be updated by the user, or by other users having the appropriate rights, also as explained below.

Note that, in accordance with the invention, the Internet caller profile does not depend on the service provider and so is not limited to a particular service provider. The Internet caller profile can therefore contain parameters applicable to different service providers so that the user has the same personalized Internet access regardless of the service provider chosen. This does not rule out the Internet caller profile including parameters specific to a particular service provider.

Various applications of the invention will now be described.

Pre-payment

The invention provides for pre-payment for calls to the Internet. In this case the telephone call is set up with the intelligent network and the user effects the pre-payment using pre-payment functions known per se of the intelligent network. The Internet caller profile includes information relating to the existence of the pre-payment facility, to indicate to the service provider that the transaction concerned is a pre-paid transaction. It also includes information relating to the pre-paid amount, which is updated as the credit is used up. Any surplus can be retained and later allocated to another transaction. Otherwise, when the pre-paid amount is used up, the connection is broken off, where applicable after the user is sent an invitation to renew their credit.

This application avoids excessively high bills generated either by negligence or by children or third parties. It also reduces complaints against the Internet.

Access without subscription

The invention provides Internet access without permanent subscription to an Internet service provider. In this case the user profile indicates that the user has no subscription with the service provider. The Internet access request submitted to the service provider can nevertheless be accepted and the costs generated by the connection can be transmitted by the access provider to the intelligent network so that they can be billed directly to the users telephone account.

This application of the invention can be used to send faxes or electronic mail via the Internet network without an Internet subscription, for example.

This application of the invention can also be combined with the pre-payment application.

It avoids the tiresome aspects of a subscription process, which can put users off.

Surveillance and call interruption

The telephone network can interrupt the call if it receives a prohibited access indication. This can occur in the case of call filtering, for example, as described in French patent application No. FR 98 05539. In this case the content of Internet transactions is filtered by the service provider. Violation of the filter criteria (for example criteria set by parents for their children) can lead the intelligent network to interrupt the call, simply by virtue of the service provider updating the Internet profile. In this minimal situation, the Internet caller profile is simply used to disconnect the user.

Filtering of this kind can also be implemented nationally, for example to meet statutory constraints.

This solution is more reliable and more effective than local management—for example in the home or at a PABX. Restriction of access to lists and to authorizations is more efficient. Furthermore, the quality of service provided by the intelligent network operator can be expected to be better than the domestic service.

Interception of repetitive access attempts

The Internet caller profile can prevent a new connection by the same caller, for example after one or more filter violations; all that the service provider has to do in this situation is to update the user's Internet caller profile to indicate that subsequent calls will be refused.

The invention therefore enables the telephone call to the service provider to be blocked; this prevents congestion of the service providers telephone resources by calls that would have to be rejected for one reason or another.

The user profile can be updated to allow calls again, either by a user having the appropriate rights (for example an adult entitled to update the user profile of a minor) or after a predetermined time period.

This invention can be used to manage "grey" or "black" lists for each service provider or for Internet access in general.

Creation of private virtual groups

Internet caller profiles can be used to define caller groups, allocate them identical rights, and manage them conjointly.

This can be beneficial for the service provider using the intelligent network or for Internet service providers, offering improved client management and better segmented and targeted services; this can also be useful for users creating private groups, for example parents creating groups for their children, teaching staff creating groups for students or the management of a business or department creating groups for employees.

Authentication

Internet callers can be authenticated, as explained above. The level of authentication can depend on their caller profile or virtual private group.

Incoming telephone calls

The invention can also offer incoming telephone calls, in the form of pocketed voice signals, during the Internet connection.

The invention can be implemented by various hardware means. It can simply be implemented by providing the telephone network management unit (12 in FIG. 1) with means for allocating an Internet caller profile on receiving calls for access to the Internet. Means are also provided for sending the service provider the Internet profile, as symbolized by the arrow 13 in FIG. 1. In the opposite direction, the Internet caller profile can be updated by the service provider, as symbolized by the arrow 14 running from the telephone system management unit. All that is required for this is to provide means for sending the telephone network management unit information for updating Internet caller profiles, for example. This information can be sent via the telephone network.

Of course, the present invention is not limited to the examples and embodiments described and shown but is open to many variants that will suggest themselves to the skilled person. For example, the invention could be applied to types of network other than the Internet. The Internet caller profile can include information other than that described in the various examples above, depending on the intended applications and the services offered.

What is claimed is:

1. A method of personalizing access to the Internet via an access network and an Internet service provider, comprising the following steps:

said access network allocates an Internet caller profile before setting up a telephone call to access the Internet, wherein said Internet caller profile comprises all the parameters used by said Internet service provider to customize Internet access, then said access network transmits said Internet caller profile to said Internet service provider, and then said Internet service provider permits access to the Internet in accordance with said Internet caller profile.

2. The method claimed in claim 1 wherein said access network is an intelligent network.

3. The method claimed in claim 1 wherein said access network includes an intelligent function for managing Internet caller profiles.

4. The method claimed in claim 1 wherein said Internet caller profile includes information relating to Internet transactions such as access filtering information.

5. The method claimed in claim 1 wherein said Internet caller profile includes information relating to said telephone call such as billing, payment or call authorization information.

6. The method claimed in claim 1 wherein said Internet caller profile includes information common to all Internet service providers and information specific to each Internet service provider.

7. The method claimed in claim 1 comprising a step in which said Internet service provider updates said Internet caller profile.

8. The method claimed in claim 1 including a step in which said user updates said Internet caller profile.

9. The method claimed in claim 1 including a step in which said access network creates said Internet caller profile.

10. The method claimed in claim 1 wherein said Internet caller profile of a user is retained from one Internet access to another.

11. The method claimed in claim 1 wherein said Internet caller profile of a user is retained in the event of a change of Internet service provider.

12. A method of network access, comprising:

initiating a call over a telephone network of a telephone network provider using a telephone number associated with a plurality of Internet service providers;

authenticating a user initiating said call, wherein said authenticating is performed by said telephone network provider;

retrieving a profile of said user, wherein said profile comprises all the parameters used by one of said Internet service providers to customize Internet access, and wherein said retrieving is performed by said telephone network provider;

selecting one of said plurality of Internet service providers based on said profile of said user;

transmitting information, based on said profile of said calling user, to said selected one of said plurality of Internet service providers; and then setting up said call between said user and said selected one of said plurality of Internet service providers.

13. A method of network access, comprising:

initiating a call over a telephone network of a telephone network provider using a telephone number associated with an Internet service provider;

authenticating a user initiating said call, wherein said authenticating is performed by said telephone network provider;

retrieving a profile of said user, wherein said profile comprises all the parameters used by said Internet service provider to customize Internet access, and wherein said retrieving is performed by said telephone network provider;

making a connection decision based on said profile of said user, wherein said connection decision is performed by said telephone network provider;

transmitting information, only when said connection decision is affirmative, from said telephone network provider to said Internet service provider; and then setting up said call between said user and said Internet service provider.

* * * * *